United States Patent
Sabnis et al.

(10) Patent No.: US 9,802,713 B2
(45) Date of Patent: Oct. 31, 2017

(54) METHOD AND SYSTEM FOR IMPROVING SITUATIONAL AWARENESS OF UNANTICIPATED YAW ON A ROTORCRAFT SYSTEM

(71) Applicant: HONEYWELL INTERNATIONAL INC., Morristown, NJ (US)

(72) Inventors: Rohini Sabnis, Karnataka (IN); Sriram P R, Tamilnadu (IN); Mohammed Ibrahim Mohideen, Karnataka (IN); Sreekiran Wukkalam Srinivas, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 12 days.

(21) Appl. No.: 14/833,641

(22) Filed: Aug. 24, 2015

(65) Prior Publication Data

US 2017/0057658 A1    Mar. 2, 2017

(51) Int. Cl.
| | | |
|---|---|---|
| B64D 45/00 | (2006.01) | |
| G08G 5/00 | (2006.01) | |
| G01C 23/00 | (2006.01) | |
| G05D 1/00 | (2006.01) | |

(52) U.S. Cl.
CPC ............ B64D 45/00 (2013.01); G01C 23/00 (2013.01); G05D 1/00 (2013.01); G08G 5/0047 (2013.01)

(58) Field of Classification Search
None
See application file for complete search history.

(56) References Cited

U.S. PATENT DOCUMENTS

| | | | |
|---|---|---|---|
| 4,794,793 A | 1/1989 | Favre et al. | |
| 5,657,009 A | 8/1997 | Gordon | |
| 5,890,101 A | 3/1999 | Schaefer et al. | |
| 6,466,888 B1 | 10/2002 | McCool et al. | |
| 8,798,814 B1* | 8/2014 | Spencer, V | B64D 43/00 |
| | | | 244/10 |
| 2012/0314034 A1 | 12/2012 | Ott et al. | |
| 2015/0088342 A1* | 3/2015 | Conner | G01W 1/10 |
| | | | 701/14 |

FOREIGN PATENT DOCUMENTS

| | | |
|---|---|---|
| EP | 1787907 A2 | 5/2007 |
| EP | 2966635 A2 | 1/2016 |
| KR | 101501133 B1 | 3/2015 |

OTHER PUBLICATIONS

Aragon, C.R., Usability Evaluation of a Flight-Deck Airflow Hazard Visualization System; Publication Year: 2004; Source: Digital Avionics system conference.
White, WJ.; "Advisory Circular: Unanticipated Right Yaw in Helicopters", U.S. Department of Transportation—Federal Aviation Administration; Dec. 26, 1995.
Extended EP Search Report for Application No. 16185000.3-1557 dated Feb. 20, 2017.

* cited by examiner

Primary Examiner — James M McPherson
(74) Attorney, Agent, or Firm — Lorenz & Kopf, LLP

(57) ABSTRACT

A method and system for alerting a pilot to a potential unanticipated LTE with simple intuitive symbology on the cockpit display is provided. The provided method and system evaluates rotorcraft airspeed, wind velocity, wind direction, and rotorcraft height above ground to predict several scenarios for LTE zones. The provided method and system overlays or superimposes simple intuitive symbology on the existing PFD and/or MFD to alert a pilot to a potential LTE.

16 Claims, 7 Drawing Sheets

METHOD AND SYSTEM FOR IMPROVING SITUATIONAL AWARENESS OF UNANTICIPATED YAW ON A ROTORCRAFT SYSTEM

TECHNICAL FIELD

Embodiments of the subject matter described herein relate generally to rotorcraft display systems and, more particularly, to alerting a pilot to a potential unanticipated yaw.

BACKGROUND

Unanticipated yaw (referred to herein as loss of tail rotor effectiveness (LTE)) causes a rotorcraft to twist around a vertical axis and requires a deft and vigilant response on the part of the rotorcraft pilot in order to safely recover. A rotorcraft is more susceptible to LTE when the pilot is operating in low airspeed and there is either a left crosswind (for rotorcraft with blades that rotate counter clockwise) or a tailwind. Right hand turns are more susceptible to LTE than left hand turns (again, for rotorcraft with blades that rotate counter clockwise). Therefore, during the course of rotorcraft operations, maintaining acute awareness of wind direction and wind velocity is essential.

During the course of rotorcraft operations, pilots are required to make accurate and fast interpretations of the information presented by all components of the rotorcraft display system. Specifically, the rotorcraft pilot is heavily dependent upon information presented on the cockpit display, which typically comprises a primary flight display (PFD) and a multi-function display (MFD). The PFD and MFD visually convey information (e.g., flight path information, Navigational Aids (NAVAID), airspace information, terrain information, weather information, performance information, traffic information, and the like) obtained from various databases, sensors and transponders.

Accordingly, alerting a pilot to a potential unanticipated LTE with simple intuitive symbology on the cockpit display is desirable. The desired method and system evaluates rotorcraft airspeed, wind velocity, wind direction, and rotorcraft height above ground to predict several scenarios for LTE zones. The desired method and system overlays or superimposes simple intuitive symbology on the existing PFD and/or MFD to alert a pilot to a potential LTE. The desired method and system decreases pilot cognitive workload, and thus increases pilot situational awareness.

BRIEF SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A method for alerting a pilot to a potential loss of tail rotor effectiveness (LTE) on a rotorcraft having a tail rotor is provided. The method comprises: processing data from (i) an air data computer (ADC), (ii) a performance database, and (iii) a weather source, to determine whether the rotorcraft is within a LTE zone; when it is determined that the rotorcraft is within the LTE zone, determining, with respect to the rotorcraft, a wind velocity in the LTE zone and a wind direction in the LTE zone; and overlaying, on a cockpit display, a visually distinguishable symbol indicative of the wind velocity in the LTE zone and the wind direction in the LTE zone.

Another method for alerting a pilot of a rotorcraft having a tail rotor to a potential loss of tail rotor effectiveness (LTE) is provided. The method comprises: processing data from an air data computer (ADC) and from a performance database to determine whether a forward airspeed of the rotorcraft is at or below a predetermined minimum forward airspeed threshold; processing data from a weather source to determine wind velocity and wind direction; determining that the rotorcraft is within a LTE zone when the forward airspeed of the rotorcraft is at or below the predetermined minimum forward airspeed threshold and either (i) the wind direction is from about 210 degrees to about 330 degrees with respect to the rotorcraft and the tail rotor is moving air in the same direction as the wind direction, or (ii) the wind direction is from about 285 degrees to about 315 degrees and the wind velocity is from about 10 Knots to about 30 Knots; and when it is determined that the rotorcraft is within a LTE zone, overlaying, on a primary flight display, a visually distinguishable symbol indicative of the wind velocity in the LTE zone and the wind direction in the LTE zone.

Also provided is a system for alerting a pilot of a rotorcraft having a tail rotor to a potential loss of tail rotor effectiveness (LTE). The system comprises: an air data computer (ADC) for providing rotorcraft airspeed and rotorcraft altitude; a performance database for providing rotorcraft data; a source of weather data for providing temperature and wind conditions; a display system comprising a cockpit display; and a processor coupled to the ADC, performance database, source of weather data, and the display system, the processor configured to: determine whether the rotorcraft is within a LTE zone based on the rotorcraft airspeed and the wind conditions, and when it is determined that the rotorcraft is within a LTE zone, (i) determine, with respect to the rotorcraft, a wind velocity in the LTE zone and a wind direction at the LTE zone, and (ii) command the display system to overlay, on the cockpit display, a visually distinguishable symbol indicative of the wind velocity in the LTE zone and the wind direction in the LTE zone.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Figure 1:
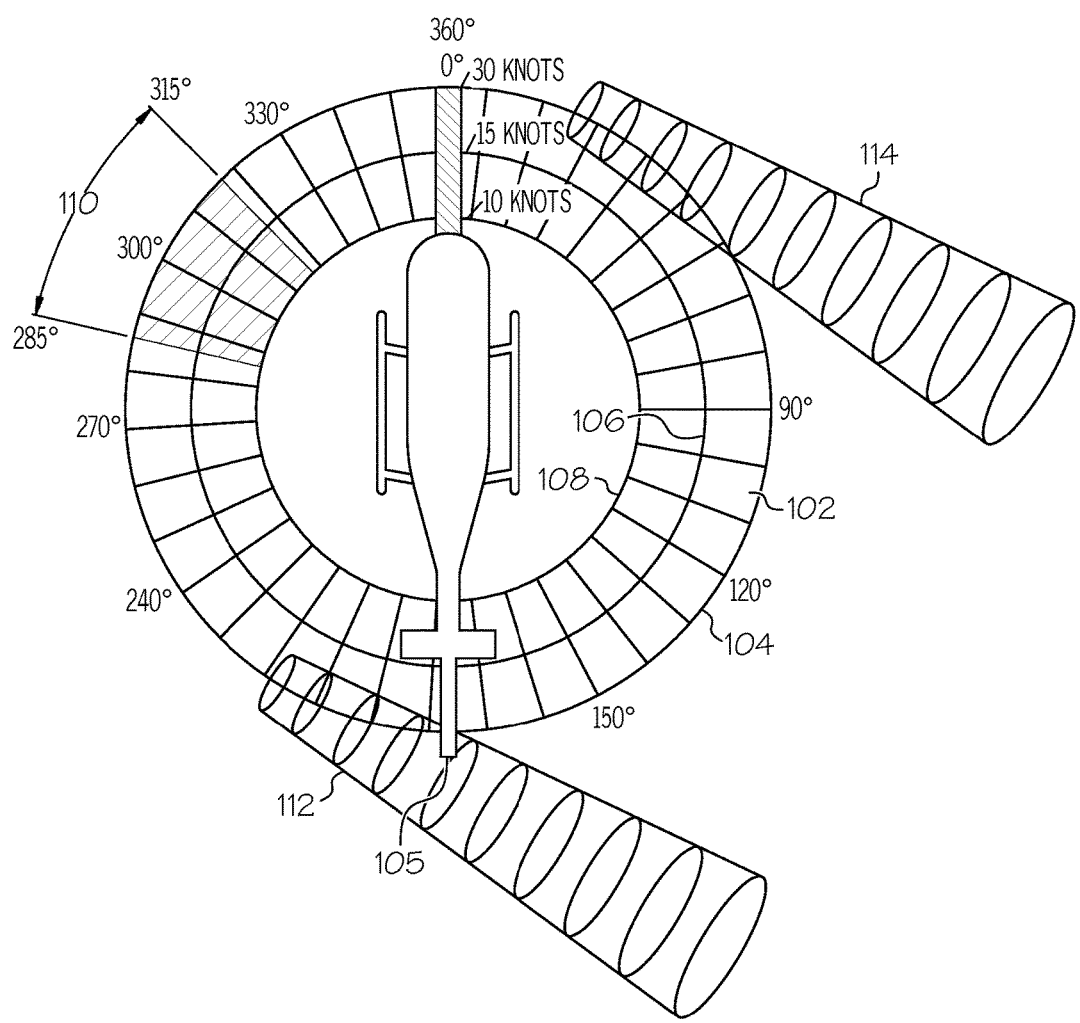
FIG. 1 illustrates a first scenario for when a rotorcraft may experience LTE.

FIG. 1 illustrates a first scenario when a rotorcraft may experience LTE. Rotorcraft 100 is centered within rotorcraft main rotor blade span 102. The circle representing the main rotor blade span 102 is demarked with degrees from zero degrees to 360 degrees. Wind velocity varies radially along the main rotor blade span 102, and FIG. 1 shows main rotor blade span 102 having wind velocity of 10 Knots (108), 15 Knots (106) and 30 Knots (104). A left "crosswind" or wind direction, with respect to the rotorcraft 100, between 285 degrees and 315 degrees is denoted as angle 110. When the wind direction is within angle 110 of the rotorcraft 100, two vortexes are created from the main rotor blade span 102. A first vortex 112 is shown engulfing the rotorcraft tail rotor 105, and a second vortex 114 is shown toward the front of the rotorcraft 100.

A first LTE zone may be described as meeting the following conditions: rotorcraft 100 has a forward speed at or below a predetermined minimum forward airspeed threshold, the cross wind direction is within angle 110 of the rotorcraft 100, and the rotorcraft tail rotor 105 is directing wind in the same direction as the cross wind. Another LTE zone may be defined more broadly, as when a left cross wind direction is within about 210 degrees to about 330 degrees from the rotorcraft 100 and rotorcraft 100 has a forward speed at or below a predetermined minimum forward airspeed threshold (A person with skill in the art will readily appreciate that rotorcraft having counter-clockwise blade rotation will be susceptible to winds coming from the right, and the same analysis will apply). In an embodiment, the predetermined minimum forward airspeed threshold for option one and option two is 30 Knots.

Figure 2:
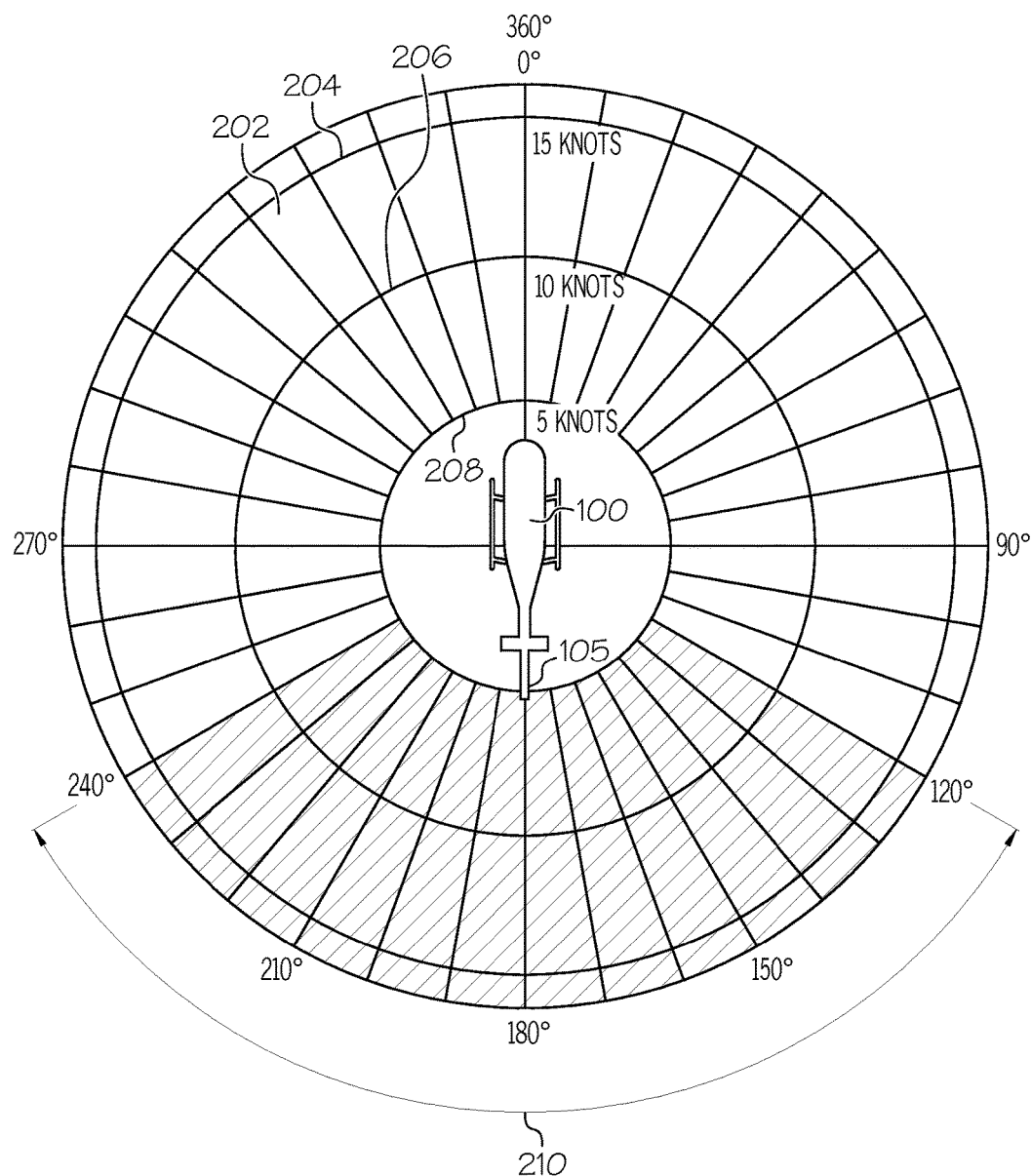
FIG. 2 illustrates a second scenario for when a rotorcraft may experience LTE.

FIG. 2 illustrates a second scenario for when a rotorcraft may experience LTE. In FIG. 2, the wind velocity from the rotorcraft main rotor blade span 102 is 5 Knots (208), 10 Knots (206), and 15 Knots (204). On occurrence of a "tailwind" or wind direction from about 120 degrees to about 240 degrees with respect to the rotorcraft 100 the rotorcraft 100 is in yet another LTE zone. In this scenario, rotorcraft 100 may weathervane into the wind direction if left unchecked.

Figure 3:
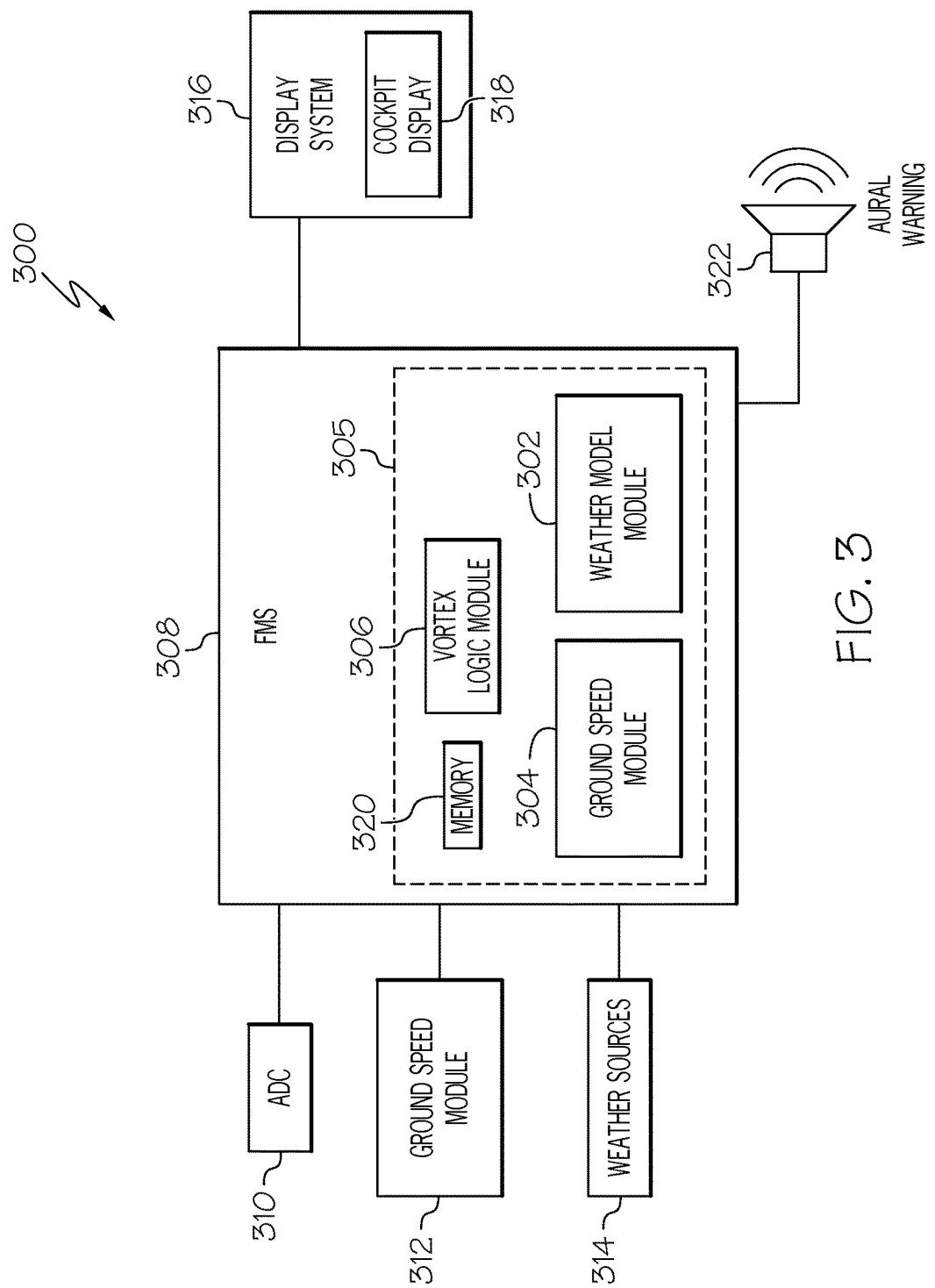
FIG. 3 is a simplified block diagram of system for alerting a pilot to a potential loss of tail rotor effectiveness, according to the embodiment.

FIG. 3 is a simplified block diagram of a system for alerting a pilot to a potential loss of tail rotor effectiveness 300, according to the embodiment. Air data computer (ADC) 310, Performance database and sensors 312, and weather sources 314 are coupled to processor 305. The processor 305 may reside within or be coupled to flight management system FMS 308, and it commands the display system 316 to generate and update cockpit display 318.

Processor 305 comprises a weather model module 302, ground speed module 304, vortex logic module 306, and memory 320. In practice, processor 305 may comprise, or be associated with, any suitable number of individual microprocessors, flight control computers, navigational equipment, memories (such as memory 320), power supplies, storage devices, interface cards, and other standard components known in the art. In this respect, the processor 305 may include or cooperate with any number of software models, software programs (e.g., rotorcraft display programs) or instructions designed to carry out the various methods, process tasks, calculations, and control/display functions described below. As mentioned, processor 305 may be included within a Flight Management System (FMS) 308 as shown in FIG. 3, or may reside separately. The FMS 308 may provide the processor 305 with wind models and predicted ground speed for each waypoint of a plurality of waypoints along a navigation route for a rotorcraft, and the processor 305 may, in response, predict a wind velocity and wind direction for each waypoint of the plurality of waypoints.

Image-generating devices suitable for use as cockpit display 318 typically take the form of a primary flight display (PFD) and a multi-function display (MFD), and include various analog (e.g., cathode ray tube) and digital (e.g., liquid crystal, active matrix, plasma, etc.) display devices. In certain embodiments, cockpit display 318 may assume the form of a Head-Down Display (HDD) or a Head-Up Display (HUD) included within a rotorcraft's Electronic Flight Instrument System (EFIS).

During operation of the system for alerting a pilot to a potential loss of tail rotor effectiveness 300, the ADC 310, Performance database and sensors 312, weather sources 314, and FMS 308 continually provide processor 305 with navigational data pertaining to terrain, weather (including wind direction and wind velocity), rotorcraft altitude, rotorcraft status, and the like. In response to this combination of input data, processor 305 commands the display system 316 to produce 2D and 3D graphical displays on the PFD and MFD of the cockpit display 318 that visually provide a composite of navigation information pertaining to the host aircraft, weather, navigational route information, elevation, terrain, and potential LTE. Processor 305 may provide the cockpit display 318 with a composite image in a two dimensional format (e.g., as a moving map display), or a three dimensional format (e.g., as a perspective display), or in a hybrid format (e.g., in a picture-in-picture or split screen arrangement). Processor 305 may command an aural warning device 322, such as a speaker, to emit an aural warning when it is determined that there is a potential loss of tail rotor effectiveness.

As is illustrated in FIGS. 4, 5, 6, and 7, when processor 305 determines that the rotorcraft is within a potential LTE zone and/or experiencing in ground effect (referred to herein as IGE and described in connection with FIG. 7), the processor 305 commands the display system 316 to superimpose or overlay visually distinguishable symbology on symbols traditionally displayed on the existing cockpit display 318 to alert the pilot. As mentioned, processor 305 may also command an aural warning device 322, such as a speaker, to emit an aural warning. The visually distinguishable symbology prompts the pilot to begin correction by providing a simple, intuitive visual notification to the pilot. Various methods or techniques may be used to render visually distinguishable symbology, such as, but not limited to, depicting symbols using: highlighting, color, flashing, and dotted or broken lines.

Figure 4:
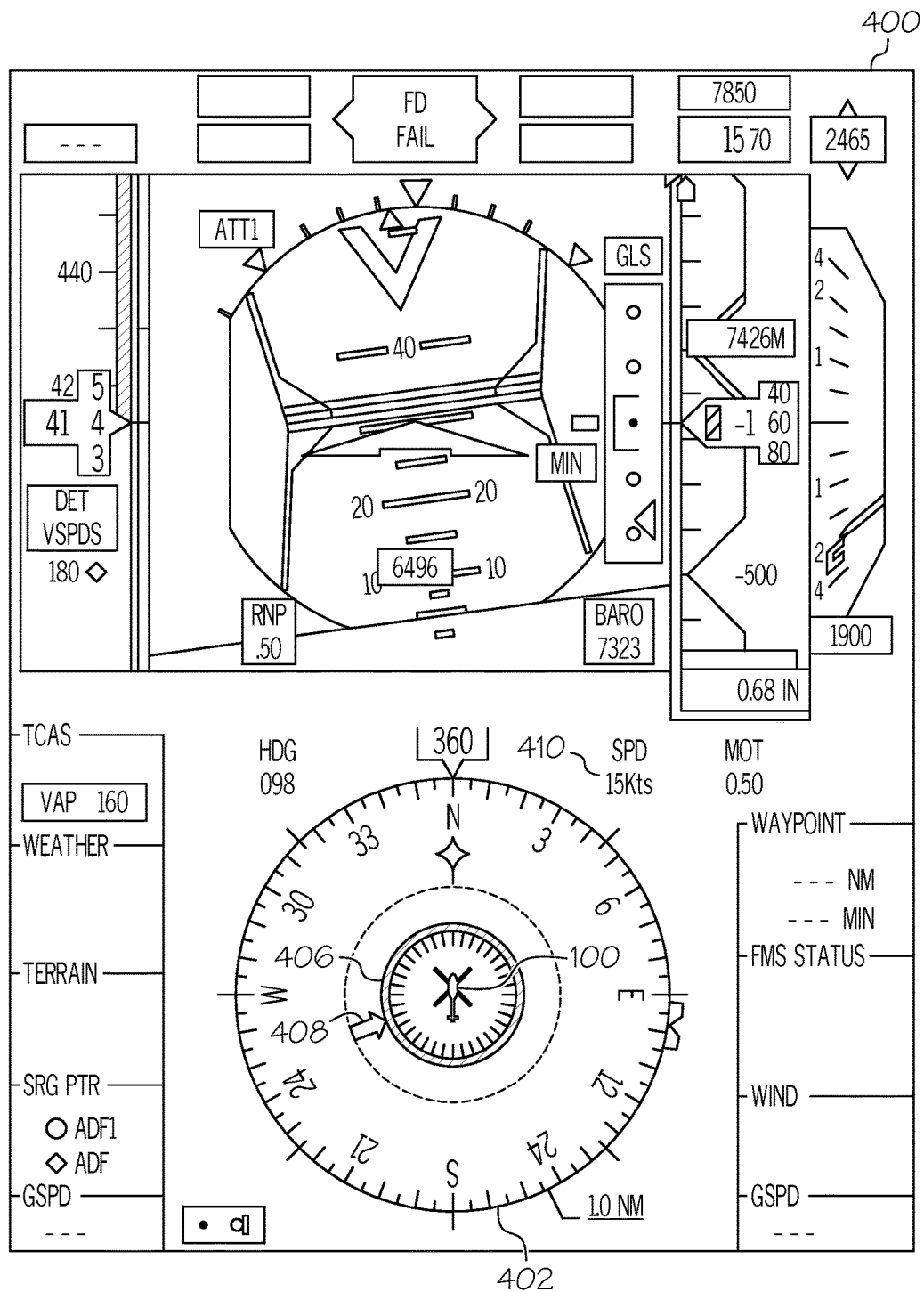
FIG. 4 is a simplified illustration of a primary flight display (PFD) with an alert for potential LTE, in accordance with a first option of the embodiment.

FIG. 4 is a simplified illustration of a primary flight display (PFD) 400 with an alert for potential LTE, in accordance with a first option of the embodiment. Traditionally, a symbol for the rotorcraft 100 is shown in a compass header symbol 402 on the PFD 400 to show the heading direction of the rotorcraft 100. In the exemplary embodiment, the processor 305 has determined that rotorcraft 100 is in a LTE zone. Responsive to determining that the rotorcraft 100 is in a LTE zone, a visually distinguishable symbol, in the form of a circle 406, is superimposed or overlaid on the PFD 400 such that circle 406 is within compass header symbol 402, and surrounds the rotorcraft 100. In addition, a visually distinguishable arrow 408 is superimposed or overlaid on PFD 400, and oriented to point at a location on circle 406 that indicates the determined "cross wind" wind direction with respect to rotorcraft 100. The magnitude of the wind velocity at the LTE zone is displayed at 410. The visually distinguishable arrow 408 may be removed from the PFD 400 when the following conditions are true: the forward speed of the rotorcraft 100 is no longer at or below a predetermined minimum forward airspeed threshold and the processor determines that the rotorcraft 100 is not in a LTE zone.

Figure 5:
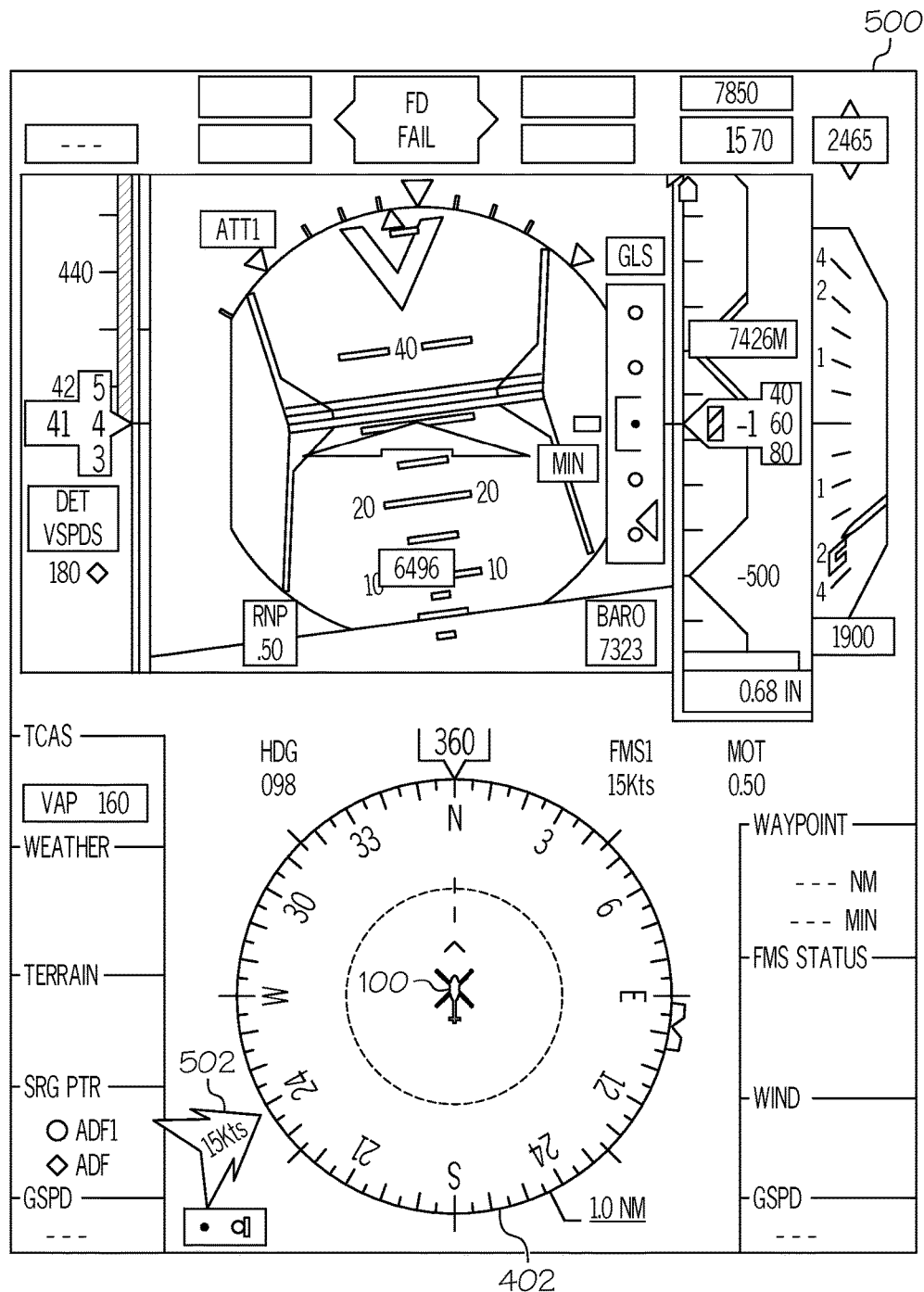
FIG. 5 is a simplified illustration of a primary flight display (PFD) with an alert for potential LTE, in accordance with a second option of the embodiment.

FIG. 5 is a simplified illustration of a primary flight display (PFD) 500 with an alert for potential LTE, in accordance with a second option of the embodiment. As with FIG. 4, a symbol for the rotorcraft 100 is shown in a compass header symbol 402 traditionally rendered on the PFD 500 to show the heading direction of the rotorcraft 100. In the exemplary embodiment, the processor 305 has determined that the rotorcraft 100 is in a LTE zone. Responsive to determining that the rotorcraft 100 is in a LTE zone, a visually distinguishable symbol 502 is superimposed or overlaid on PFD 500, and oriented to point at compass header symbol 402 at a location on compass header symbol 402 that indicates the determined "cross wind" wind direction. Wind velocity at the LTE zone is displayed within the symbol 502. The magnitude of the wind velocity at the LTE zone is displayed within symbol 502. In the embodiment, symbol 502 has the shape of a jagged arrow; however, other visually intuitive shapes are contemplated.

Figure 6:
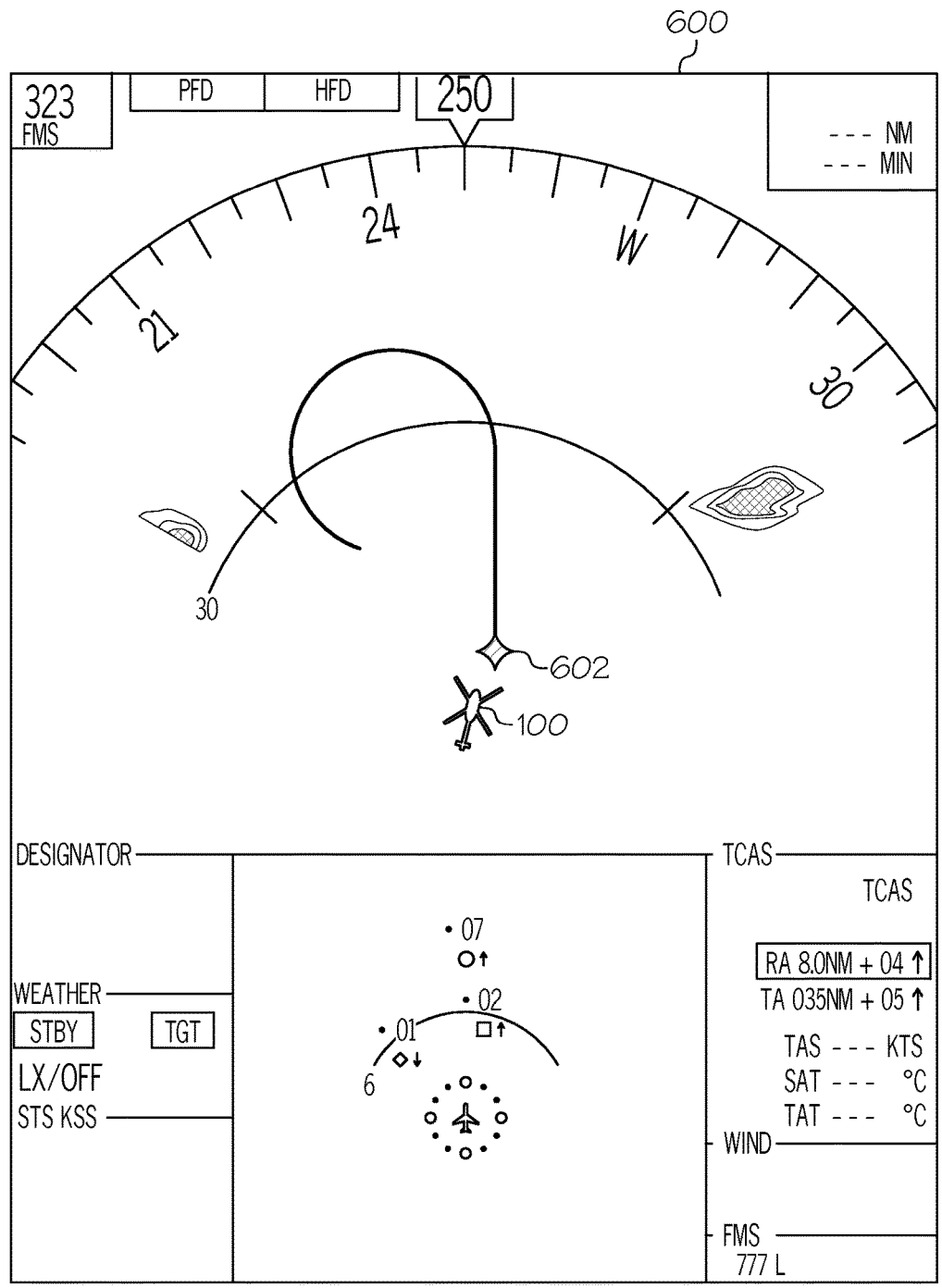
FIG. 6 is a simplified illustration of a multi-function display (MFD) with an alert that a waypoint is in a potential LTE zone, in accordance with the embodiment.

FIG. 6 is a simplified illustration of a multi-function display (MFD) with an alert that a waypoint is in a potential LTE zone, in accordance with the embodiment. As previously mentioned, the FMS may provide wind models and predicted ground speed for each waypoint of a plurality of waypoints along a navigation route, and, in response, the processor 305 predicts a wind velocity and wind direction for each waypoint of the plurality of waypoints. In the embodiment shown in FIG. 6, the processor 305 has further determined that waypoint 602, along a projected flight course for rotorcraft 100, is in a LTE zone. Responsive to determining that waypoint 602 is in a LTE zone, waypoint 602 is visually altered by overlaying waypoint 602 with a visually distinguishable symbol having a similar waypoint shape. In the embodiment, symbol used for waypoint 602 has a similar waypoint shape as traditional waypoint symbols; however, other visually intuitive colors and shapes are contemplated.

Figure 7:
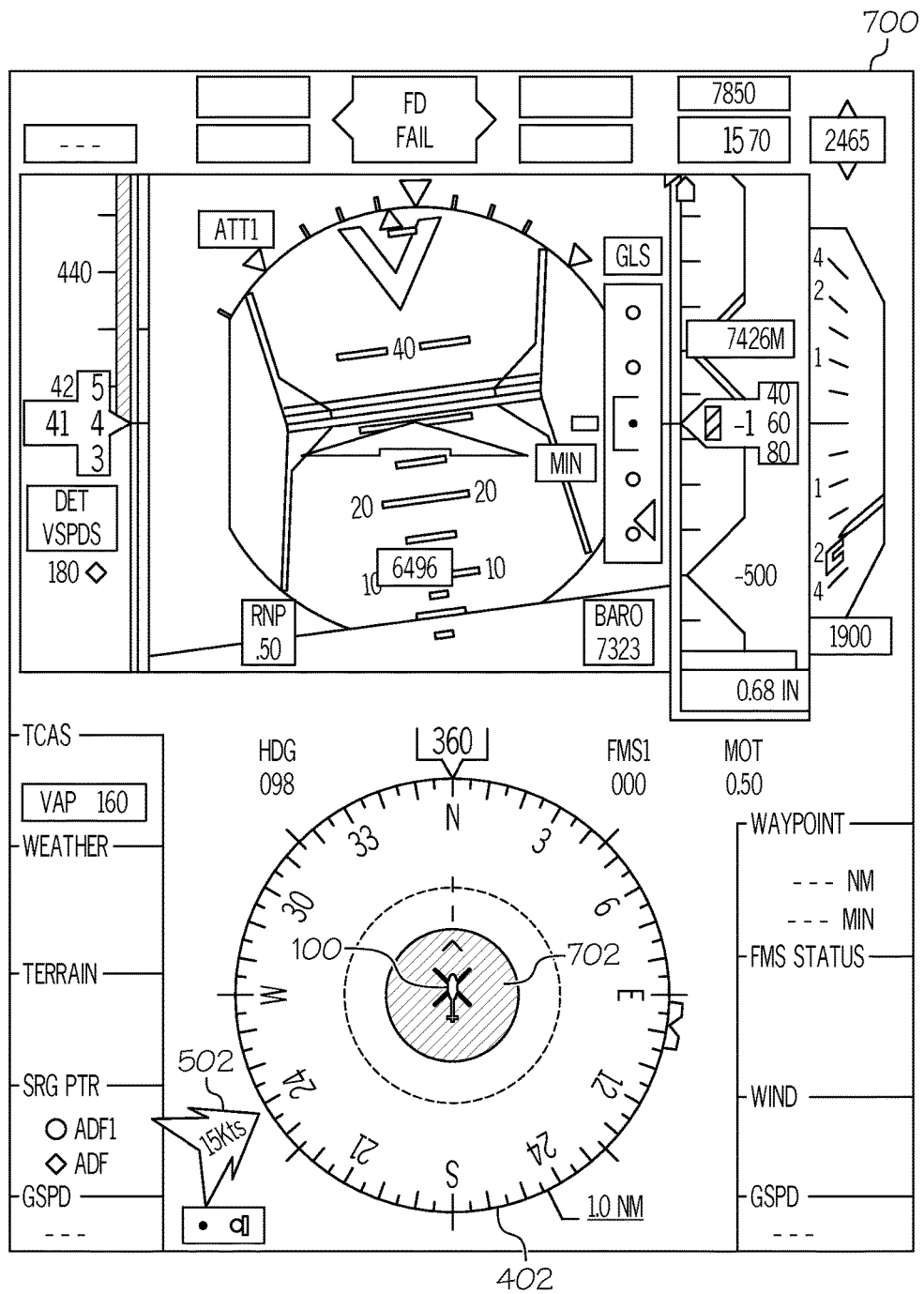
FIG. 7 is a simplified illustration of a primary flight display (PFD) 700 with an alert for an LTE zone in addition to an in ground effect (IGE), in accordance with the embodiment.

FIG. 7 is a simplified illustration of a primary flight display (PFD) 700 with an alert for an LTE zone in addition to an alert for "in ground effect" (IGE), in accordance with the embodiment. IGE is a phenomenon that influences rotorcraft performance that occurs while the rotorcraft is flying at a forward speed at or below a predetermined minimum forward airspeed threshold, and close to the ground (herein, "close to the ground" is defined as at or below a predetermined minimum height above ground). In the course of rotorcraft operations, the rotorcraft may go in and out of experiencing IGE, in addition to flying into a LTE zone. In the exemplary embodiment, processor 305 determines whether the rotorcraft 100 is experiencing IGE and initiates a visual alert when it is determined that the rotorcraft is experiencing IGE. When it is determined that the rotorcraft is not experiencing IGE, a displayed IGE symbol is removed from the cockpit display 318. In this manner, a pilot is alerted to a rotorcraft going in and out of experiencing IGE.

The embodiment supports alerting the rotorcraft pilot of the LTE according to either option one (FIG. 4) or option two (FIG. 5), and then further alerting the pilot to IGE. In FIG. 7, symbol 502 alerts the pilot to the LTE zone, showing a corresponding 15 Knots of wind velocity. To additionally alert the pilot to IGE, a visually distinguishable, translucent, symbol 702 is superimposed over the rotorcraft 100 symbol within the compass header symbol 402. In FIG. 7, symbol 702 is a circle with a slightly shaded center; however variations in symbol 702 are contemplated.

Thus, there has been provided a method and system for alerting a pilot to a potential unanticipated LTE with simple intuitive symbology on the cockpit display. The provided method and system evaluates rotorcraft airspeed, wind velocity, wind direction, and rotorcraft height above ground to predict several scenarios for LTE zones. The desired method and system overlays or superimposes simple intuitive symbology on the existing PFD and/or MFD to alert a pilot to a potential LTE. The provided method and system decreases pilot cognitive workload, and thus increases pilot situational awareness.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for alerting a pilot of a rotorcraft having a tail rotor to conditions sufficient to cause a loss of tail rotor effectiveness (LTE), the method comprising:
   at a processor (i) coupled to a flight management system (FMS), an air data computer (ADC) and a performance database and sensors, and (ii) comprising a weather model module, a ground speed module, a vortex logic module and a memory,
   continually receiving, for the rotorcraft, navigational data, wind velocity and wind direction, rotorcraft status and rotorcraft altitude;
   continually processing the received data;
   determining, with respect to a heading of the rotorcraft, a wind velocity and a wind direction;
   determining, based on a combination of the wind velocity and the wind direction, that the rotorcraft is in a LTE zone, defined as experiencing the conditions sufficient to cause LTE; and
   overlaying, on a cockpit display, a visually distinguishable symbol indicative of the wind velocity in the LTE zone and the wind direction in the LTE zone.

2. The method of claim 1, wherein determining that the rotorcraft is within the LTE zone comprises determining that the rotorcraft is operating at a low airspeed, defined as a forward rotorcraft airspeed is at or below a predetermined minimum forward airspeed threshold.

3. The method of claim 2, wherein the predetermined minimum forward airspeed threshold is substantially 30 Knots.

4. The method of claim 2, wherein determining that the rotorcraft is within a LTE zone further comprises determining that the wind direction is coming toward the rotorcraft from about 120 degrees to about 330 degrees with respect to the heading of the rotorcraft.

5. The method of claim 4, wherein determining that the rotorcraft is within a LTE zone further comprises determining that the tail rotor is moving air in a same direction as the wind direction when the wind direction is from about 210 degrees to about 330 degrees with respect to the heading of the rotorcraft.

6. The method of claim 4, wherein determining that the rotorcraft is within a LTE zone further comprises determining that the wind velocity is from about ten knots to about 30 knots and the wind direction is from about 285 degrees to about 315 degrees with respect to the heading of rotorcraft.

7. The method of claim 4, wherein overlaying a visually distinguishable symbol comprises superimposing, on a compass header symbol indicating the heading of the rotorcraft, a symbol that is indicative of the wind velocity and the wind direction in the LTE zone.

8. The method of claim 3, wherein overlaying a visually distinguishable symbol comprises superimposing, on a compass header symbol indicating the heading of the rotorcraft, a symbol that is indicative of the wind velocity and the wind direction in the LTE zone.

9. The method of claim 4, further comprising:
   determining whether a waypoint is within the LTE zone; and
   visually altering, on the cockpit display, a symbol indicative of the waypoint when it is determined that the waypoint is in the LTE zone.

10. The method of claim 9, further comprising:
    determining, based on the forward rotorcraft airspeed and a rotorcraft height above ground, that the rotorcraft is experiencing in ground effect (IGE); and
    superimposing on a compass header symbol, a visually distinguishable symbol indicative of the IGE.

11. The method of claim 10, wherein determining that the rotorcraft is experiencing IGE comprises determining that the rotorcraft is flying at or below a predetermined minimum height above ground.

12. A system for alerting a pilot of a rotorcraft having a tail rotor to
    conditions sufficient for a loss of tail rotor effectiveness (LTE), the system comprising:
    an air data computer (ADC) for providing rotorcraft forward airspeed and rotorcraft altitude;
    a performance database for providing rotorcraft data;
    a source of wind conditions data comprising wind velocity and wind direction;
    a display system comprising a cockpit display; and
    a processor coupled to the ADC, performance database, source of wind conditions data, and the display system, the processor configured to:
    determine that the rotorcraft is within a LTE zone, defined as operating within the conditions sufficient for a LTE, based on the rotorcraft forward airspeed and the wind conditions,
    determine, with respect to the rotorcraft, a wind velocity and a wind direction, and
    command the display system to overlay, on the cockpit display, a visually distinguishable symbol indicative of the wind velocity and the wind direction.

13. The system of claim 12, further comprising a flight management system (FMS) coupled to the processor, the FMS providing wind models and predicted ground speed for each waypoint of a plurality of waypoints along a navigation route, and wherein the processor is further configured to (i) predict a wind velocity and wind direction for each waypoint of the plurality of waypoints, (ii) determine that a waypoint of the plurality of waypoint is within a LTE zone, and (iii) command the display system to visually alter, on the cockpit display, a symbol indicative of the waypoint determined to be in the LTE zone.

14. The system of claim 13, wherein the processor is further configured to:
    determine that the rotorcraft is experiencing in ground effect (IGE), based on the forward rotorcraft airspeed and a rotorcraft height above ground; and
    command the display system to (i) superimpose on a cockpit display, a visually distinguishable symbol indicative of IGE while the rotorcraft is experiencing IGE and (ii) remove the visually distinguishable symbol indicative of IGE when the rotorcraft is no longer experiencing IGE.

16. The system of claim 14, wherein the processor is further configured to determine that the rotorcraft is operating at a forward rotorcraft airspeed below a predetermined minimum forward airspeed threshold and (i) the wind direction is from about 210 degrees to about 330 degrees with respect to a heading of the rotorcraft and (ii) the tail rotor is moving air in a same direction as the wind direction.

16. The system of claim 15, wherein the processor is further configured to determine that the wind direction is from about 285 degrees to about 315 degrees with respect to a heading of the rotorcraft and the wind velocity is from about 10 Knots to about 30 Knots.

* * * * *